US012449216B2

(12) United States Patent
DeSalvo

(10) Patent No.: US 12,449,216 B2
(45) Date of Patent: Oct. 21, 2025

(54) FLUID POWER ACTUATOR UTILIZING A SCREW ASSEMBLY

(71) Applicant: Textron Systems Corporation, Hunt Valley, MD (US)

(72) Inventor: Thomas James DeSalvo, Finksburg, MD (US)

(73) Assignee: Textron Systems Corporation, Hunt Valley, MD (US)

( * ) Notice: Subject to any disclaimer, the term of this patent is extended or adjusted under 35 U.S.C. 154(b) by 223 days.

(21) Appl. No.: 18/210,864

(22) Filed: Jun. 16, 2023

(65) Prior Publication Data

US 2024/0418466 A1 Dec. 19, 2024

(51) Int. Cl.
*F41A 9/87* (2006.01)
*F15B 15/14* (2006.01)
*F16H 25/22* (2006.01)

(52) U.S. Cl.
CPC ............ *F41A 9/87* (2013.01); *F15B 15/1447* (2013.01); *F15B 2015/1495* (2013.01); *F16H 25/2214* (2013.01)

(58) Field of Classification Search
CPC . F41A 9/87; F15B 15/1447; F15B 2015/1495
See application file for complete search history.

(56) References Cited

U.S. PATENT DOCUMENTS

| 4,750,588 | A | * | 6/1988 | Forshaw | ................... | F41A 9/87 |
| | | | | | | 187/244 |
| 4,932,311 | A | | 6/1990 | Mibu et al. | | |
| 5,085,401 | A | | 2/1992 | Botting et al. | | |
| 5,577,433 | A | | 11/1996 | Henry | | |
| 6,927,513 | B2 | | 8/2005 | Schreier | | |
| 7,397,209 | B2 | | 7/2008 | Hirai | | |
| 8,474,339 | B2 | | 7/2013 | Hirai | | |
| 8,561,491 | B2 | | 10/2013 | Fukano et al. | | |
| 8,573,080 | B2 | | 11/2013 | Quenerch'du et al. | | |
| 8,636,262 | B2 | | 1/2014 | Schade et al. | | |
| 8,701,834 | B2 | | 4/2014 | Jacob et al. | | |

(Continued)

FOREIGN PATENT DOCUMENTS

EP 0163602 A2 12/1985

OTHER PUBLICATIONS

Desalvo, Thomas James; "Fluid Power Actuator Utilizing a Screw and Nut Assembly," U.S. Appl. No. 18/235,224, filed Aug. 17, 2023.

(Continued)

*Primary Examiner* — J. Woodrow Eldred
(74) *Attorney, Agent, or Firm* — BainwoodHuang

(57) ABSTRACT

A fluid power actuator includes a fluid power actuator housing, a piston assembly, and a screw assembly. The piston assembly is constructed and arranged to move relative to the fluid power actuator housing in response to changes in fluid pressure within the fluid power actuator housing. The screw assembly couples with the fluid power actuator housing and the piston assembly. The screw assembly is constructed and arranged to control movement of the piston assembly relative to the fluid power actuator housing. Such a fluid power actuator is well-suited for various applications such as in loading equipment which is involved in high precision munitions loading, among others.

20 Claims, 8 Drawing Sheets

(56)    References Cited

U.S. PATENT DOCUMENTS

| | | |
|---|---|---|
| 8,823,229 B2 | 9/2014 | Brieschke |
| 9,568,077 B2 | 2/2017 | Jacob et al. |
| 9,772,013 B2 | 9/2017 | Tsai |
| 9,803,663 B2 | 10/2017 | Vanderveen et al. |
| 9,933,058 B1 | 4/2018 | Muster |
| 9,964,198 B2 | 5/2018 | Brage et al. |
| 10,024,406 B2 | 7/2018 | Stensgaard |
| 10,088,024 B2 | 10/2018 | Högberg et al. |
| 10,190,608 B2 | 1/2019 | Wildman |
| 10,371,275 B2 | 8/2019 | Lenz |
| 10,480,547 B2 | 11/2019 | Starkey et al. |
| 10,502,293 B2 | 12/2019 | Foucaut et al. |
| 10,619,653 B2 | 4/2020 | Grupp et al. |
| 10,801,594 B2 | 10/2020 | Burgess |
| 10,822,856 B2 | 11/2020 | Leonard et al. |
| 11,092,175 B1 | 8/2021 | Blanding et al. |
| 2002/0129699 A1 | 9/2002 | Falcou et al. |
| 2009/0095098 A1 | 4/2009 | Fisher et al. |
| 2015/0323049 A1 | 11/2015 | Rousseau et al. |
| 2019/0003548 A1 | 1/2019 | Fox et al. |
| 2019/0309836 A1 | 10/2019 | Laurent |
| 2022/0099112 A1 | 3/2022 | Noda et al. |

OTHER PUBLICATIONS

PCT/US2024/033524; Notification of Transmittal of the International Search Report and the Written Opinion of the International Searching Authority or the Declaration; dated Oct. 8, 2024; 12 pages.

\* cited by examiner

FLUID POWER ACTUATOR UTILIZING A SCREW ASSEMBLY

BACKGROUND

A conventional hydraulic linear actuator includes a cylinder and a piston. The cylinder restricts the piston to linear movement along a central axis defined by the cylinder.

The depth of the piston within the cylinder (i.e., how far the piston extends from the cylinder along the central axis) depends on hydraulic fluid pressure. For example, increasing the hydraulic fluid pressure within a rear chamber within the cylinder moves the piston along the central axis in an outward direction. However, decreasing the hydraulic fluid pressure within the rear chamber while there is force on the piston in the opposite direction moves the piston along the central axis back into the cylinder.

SUMMARY

It should be understood that there are deficiencies to conventional hydraulic actuators. Along these lines, the above-described conventional hydraulic linear actuator typically provides poor position precision, is susceptible to leaking/drifting over time, and may require redundant actuators to prevent failure. Accordingly, the conventional hydraulic actuator is unsuitable for certain applications such as loading munitions onto an aircraft.

Unfortunately, conventional electric linear actuators are very expensive for high force applications, routinely require lubrication, provide difficulties in manually moving loads during loss of electric power, and are not normally designed with high enough safety factors required by nuclear certification standards (e.g., U.S. Air Force nuclear certification). The electric motors for such convention electric linear actuators must be more powerful, larger, heavier, more durable, etc. to effectively operate.

Similarly, conventional electro-hydraulic linear actuators have elements of both disadvantages. Moreover, conventional electro-hydraulic linear actuators are more difficult to package inside compact areas since the electric motor, the hydraulic fluid pump, the reservoir and valve assemblies, etc. are all mounted directly to the electro-hydraulic linear actuators.

In contrast to the above-described conventional linear actuators, improved techniques involve a fluid power actuator that utilizes a screw assembly which enables actuation with minimal friction (or resistance) during operation. As will be explained in further detail shortly, such techniques alleviate the need for larger, more powerful, electric motors. Additionally, the screw assembly enhances fluid power actuator performance such as by providing high precision positioning, simple mechanical locking, and convenient manual back-up operation. In some arrangements, the screw assembly includes a low efficiency screw (e.g., a screw/nut assembly having ACME threads or similar thread geometry) to provide self-locking. In some arrangements, the screw assembly has a recirculating ball screw geometry or roller screw geometry for low friction operation. Such techniques overcome various deficiencies of conventional hydraulic, electric and electro-hydraulic linear actuators.

One embodiment is directed to a loading apparatus which includes a base, a loading assembly, and a fluid power actuator. The loading assembly includes a first end coupled with the base and a second end constructed and arranged to carry a load. The fluid power actuator includes:

(A) a fluid power actuator housing that couples with the base,
(B) a piston assembly that couples with the second end of the loading assembly, the piston assembly being constructed and arranged to move relative to the fluid power actuator housing in response to changes in fluid pressure within the fluid power actuator housing, and
(C) a screw assembly that couples with the fluid power actuator housing and the piston assembly, the screw assembly being constructed and arranged to control movement of the piston assembly relative to the fluid power actuator housing.

In some arrangements, the first end of the loading assembly forms a hinge with the base. Additionally, the second end of the load assembly includes a munitions carrier to carry munitions. Furthermore, the fluid power actuator is constructed and arranged to control height of the munitions carrier relative to the base to provide high precision munitions loading.

Another embodiment is directed to a fluid power actuator which includes a fluid power actuator housing, a piston assembly, and a screw assembly. The piston assembly is constructed and arranged to move relative to the fluid power actuator housing in response to changes in fluid pressure within the fluid power actuator housing. The screw assembly couples with the fluid power actuator housing and the piston assembly. The screw assembly is constructed and arranged to control movement of the piston assembly relative to the fluid power actuator housing.

In some arrangements, the fluid power actuator housing defines an elongated channel. Additionally, the piston assembly includes a rod-shaped portion that defines a central bore, at least a portion of the rod-shaped portion residing within the elongated channel defined by the fluid power actuator housing. Furthermore, the screw assembly includes a nut disposed in a fixed position relative to the rod-shaped portion of the piston assembly, and a screw that threads within the nut. At least a portion of the screw is disposed within the central bore defined by the rod-shaped portion of the piston assembly.

In some arrangements, the piston assembly is constructed and arranged to slide along a central axis defined by the fluid power actuator housing in response to the changes in the fluid pressure. Additionally, the screw is constructed and arranged to rotate relative to the fluid power actuator housing and the piston assembly about the central axis while remaining at a fixed location on the central axis.

In some arrangements, the fluid power actuator housing includes a first port to supply fluid to a first space within the elongated channel between the piston assembly and the fluid power actuator housing. Additionally, the fluid power actuator housing includes a second port to supply fluid to a second space within the elongated channel between the piston assembly and the fluid power actuator housing. At least one of the fluid power actuator housing and the piston assembly separate the second space from the first space.

In some arrangements, the nut and the screw define threads with trapezoidal shapes to provide self-locking between the nut and the screw. An example of a nut and a screw with a trapezoidal thread profile is a self-locking ACME screw system that uses an angle of 29 degrees. Other similar screws and nuts are suitable for use such as lead-style screws with efficiencies ranging between 20 and 80 percent (e.g., a screw/nut combination with a selected efficiency under 35 percent to provide rich and robust self-locking).

In some arrangements, the fluid power actuator further includes an electric motor coupled with the screw. The electric motor is constructed and arranged to rotate the screw in response to an electric control signal.

In some arrangements, the fluid power actuator further includes a load sensor coupled with the fluid power actuator housing and the screw, a fluid pumping assembly coupled with the fluid power actuator housing, and an electronic controller coupled with the load sensor and the fluid pumping assembly. The electronic controller is constructed and arranged to receive a sensor signal from the load sensor and operate the fluid pumping assembly to provide the changes in the fluid pressure based on the sensor signal.

In some arrangements, the load sensor includes a load cell constructed and arranged to indicate, within the sensor signal, an amount of loading between the fluid power actuator housing and the screw. Additionally, the electronic controller, when providing the changes in the fluid pressure based on the sensor signal, is constructed and arranged to minimize loading between the fluid power actuator housing and the screw.

In some arrangements, the screw assembly further includes a plurality of balls. Additionally, the nut and the screw of the screw assembly define a recirculating ball channel that recirculates the plurality of balls in a continuous path during screw assembly operation to minimize friction.

In some arrangements, the fluid power actuator further includes a brake coupled with the screw. The brake is constructed and arranged to prevent rotation of the screw when applied and allow rotation of the screw when released.

In some arrangements, the fluid power actuator further includes an electronic controller coupled with the brake. The electronic controller is constructed and arranged to coordinate brake operation with movement between the fluid power actuator housing and the piston assembly to provide precision positioning.

In some arrangements, the brake includes a set of springs that biases the brake from a disengaged state to an engaged state to provide actuator locking when power to the electronic controller is removed. Such a brake may be controlled in various ways such as hydraulically, pneumatically, or electrically.

Other embodiments are directed to apparatus, devices, and related componentry. Some embodiments are directed to various vehicles, equipment, tools, systems, sub-systems, methods, and so on, which involve a fluid power actuator that utilizes a screw assembly.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Overview

An improved technique involves a fluid power actuator that utilizes a screw assembly which enables actuation with minimal friction (or resistance) during operation. Using such a screw assembly enhances fluid power actuator performance by providing high precision positioning, offering simplified mechanical locking, removing the need for heavily provisioning an electric motor and/or other parts, and lending to convenient manual back-up operation, among other features. In accordance with certain embodiments, the screw assembly has a trapezoidal thread geometry (e.g., ACME threads) to provide self-locking. In accordance with certain embodiments, the screw assembly has a recirculating ball screw or roller screw geometry for low friction operation. Such techniques overcome a variety of deficiencies in conventional hydraulic, electric and electro-hydraulic linear actuators.

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Figure 1:
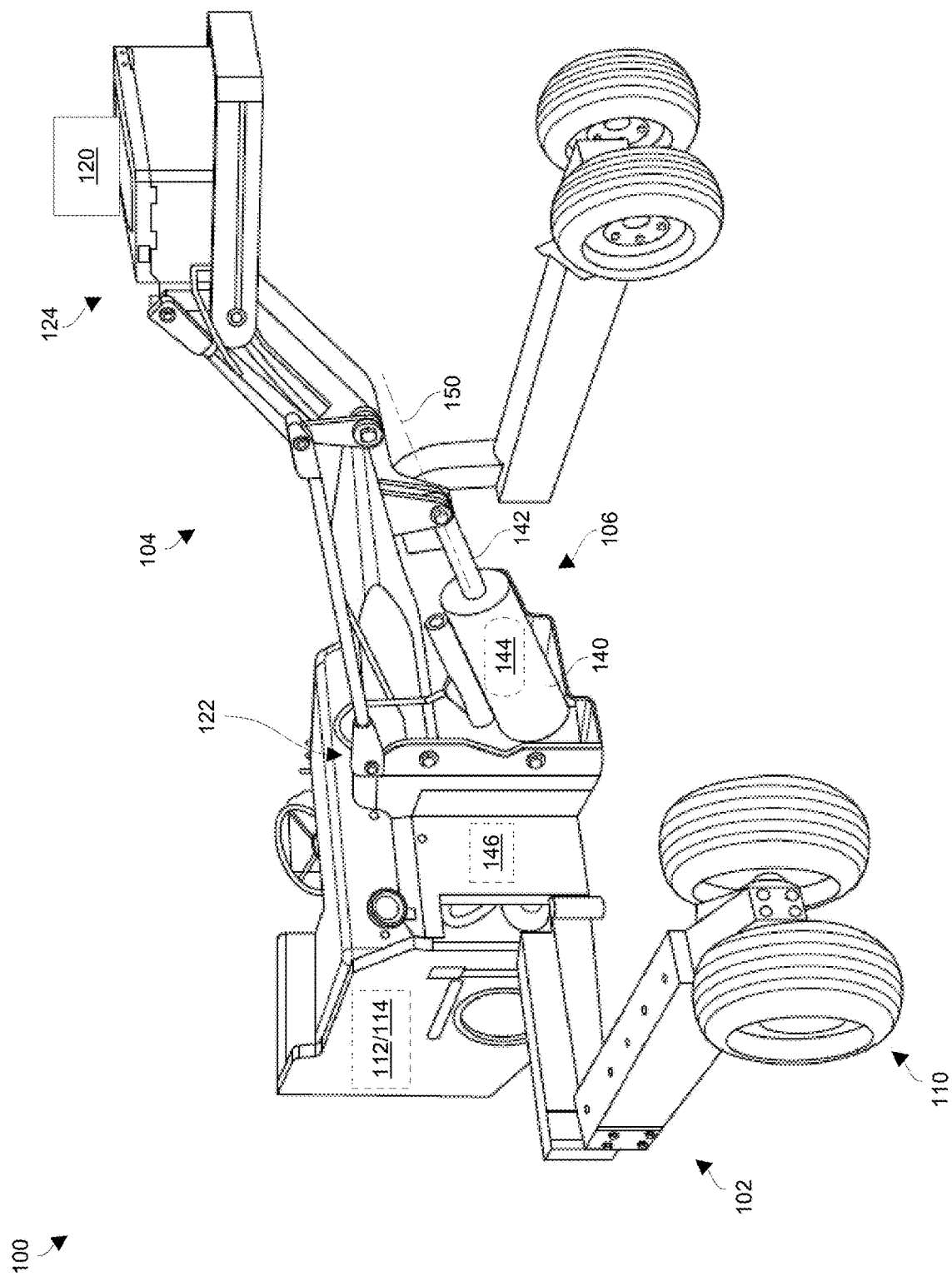
FIG. 1 is a perspective view of example equipment having a fluid power actuator which utilizes a screw assembly in accordance with certain embodiments.

FIG. 1 shows example equipment (hereinafter simply equipment) 100 that includes a fluid power actuator which utilizes a screw assembly. Such equipment 100 advantageously enjoys high precision positioning, offers simplified mechanical locking, alleviates the need for heavily provisioning an electric motor and/or other parts, and lends to convenient manual back-up operation, among other things.

As shown in FIG. 1, the equipment 100 includes a base 102, a loading assembly 104, and a fluid power actuator assembly 106. By way of example only, the equipment 100 takes the form of a loading apparatus such as a munitions loader. However, it should be understood that the equipment 100 may have different shapes, sizes, configurations, arrangements, structures, etc. combinations thereof, other than that shown. Other suitable types of equipment 100 include road vehicles, watercraft, aircraft, industrial machinery, heavy duty robotics, combinations thereof, and so on.

The base 102 is constructed and arranged to serve as a foundation and provide support for the equipment 100. The base 102 may be configured to reside at a fixed location and/or move among different locations. In some arrangements, the base 102 may be provisioned with a set of engaging members 110 (e.g., tires, tracks, propellers, combinations thereof, etc.), a set of motors 112 for propulsion/mobility (e.g., combustion engines, electric motors, combinations thereof, etc.), a power source 114 for powering the set of motors 112, and so on.

The loading assembly 104 is constructed and arranged to manage (or carry) a set of loads 120 while providing linkage with the base 102. Along these lines, the load assembly 104 has a first end 122 that couples with the base 102 and a second end 124 that interfaces with the set of loads 120.

The fluid power actuator 106 is constructed and arranged to maneuver the loading assembly 104. Along these lines, the fluid power actuator 106 includes a fluid power actuator housing 140, a piston assembly 142, a screw assembly 144, and other actuator componentry 146. The fluid power actuator housing 140 mechanically couples with the base 102 (e.g., at a first hinge or pivot location), and the piston assembly 142 mechanically couples with the loading assembly 104 (e.g., at a second hinge or pivot location). The piston assembly 142 may be restrained (e.g., internally, externally, etc.) to prevent rotation relative to the fluid power actuator housing 140.

The screw assembly 144 mechanically couples with both the fluid power actuator housing 140 and the piston assembly 142 as will be explained in further detail shortly. The screw assembly 144 and the other actuator componentry 146 are involved in operating the fluid power actuator 106 to selectively enable the piston assembly 142 to move along an actuator axis 150 and lock/hold the piston assembly 142 in place relative to the fluid power actuator housing 140.

As will be explained in further detail shortly, the fluid power actuator 106 may be operated in a low (or minimal) friction configuration such that the fluid power actuator 106 precisely controls positioning of the loading assembly 104 (e.g., during loading, during unloading, etc.), provides stability (e.g., locking in place to eliminate drift and maintain positing), and enables convenient and simple manual backup operation (e.g., to enable operation even without power). Accordingly, the fluid power actuator 106 is well-suited for various tasks in which factors such as accuracy, reliability, and safety are critical.

It should be understood that the loading assembly 104 may include multiple joints, hinges, arms, etc., and that the equipment 100 may include other mechanisms such as an additional set of actuators to operate the loading assembly 104 at various points. One or more of the additional set of actuators may be provisioned with one or more respective screw assemblies 144 in the same manner as that for the fluid power actuator 106. Further details will now be provided with reference to FIGS. 2 through 4.

Figure 2:
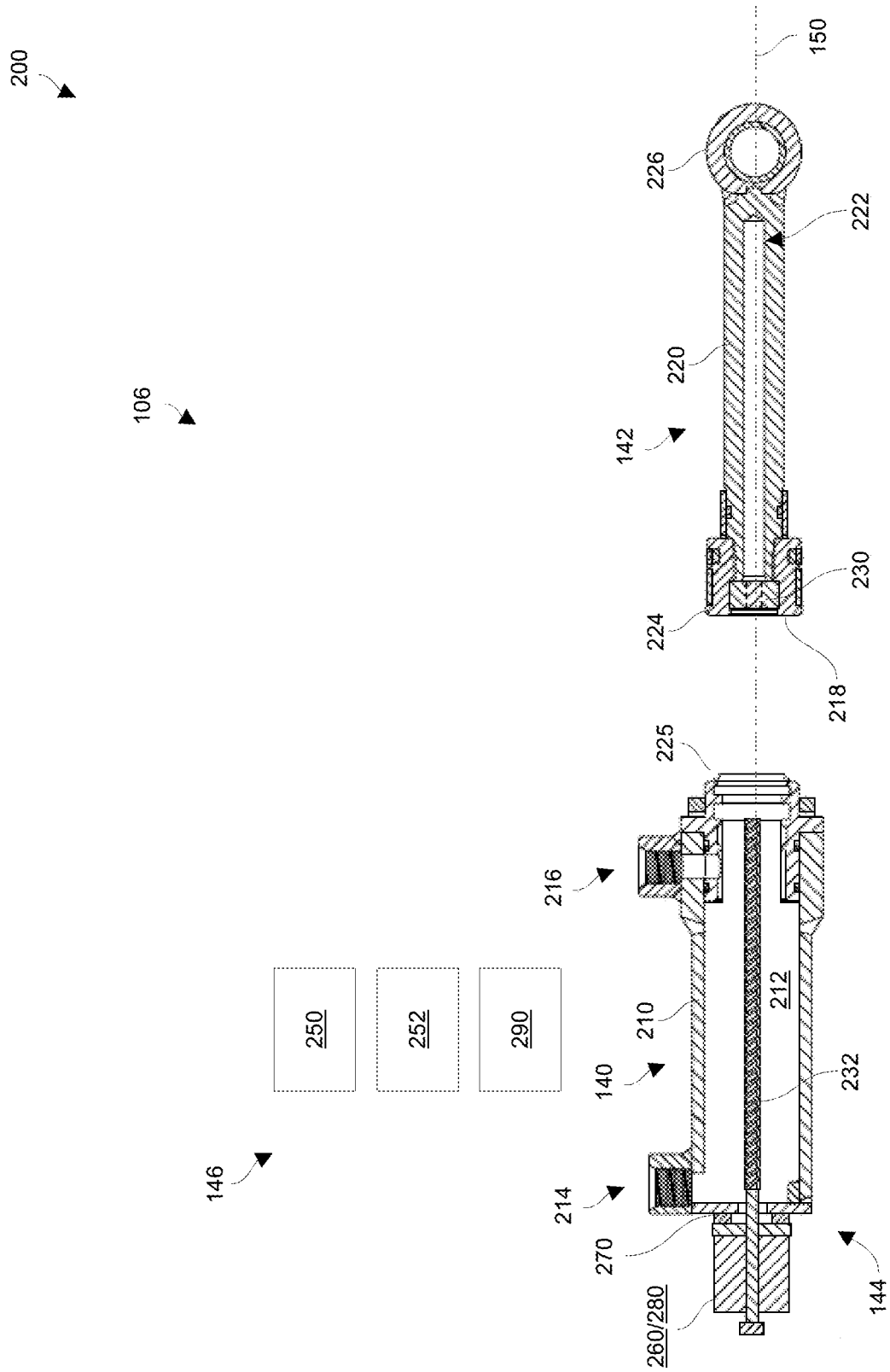
FIG. 2 is a cross-sectional, partially exploded view of a fluid power actuator which utilizes a screw assembly in accordance with certain embodiments.
Figure 3:
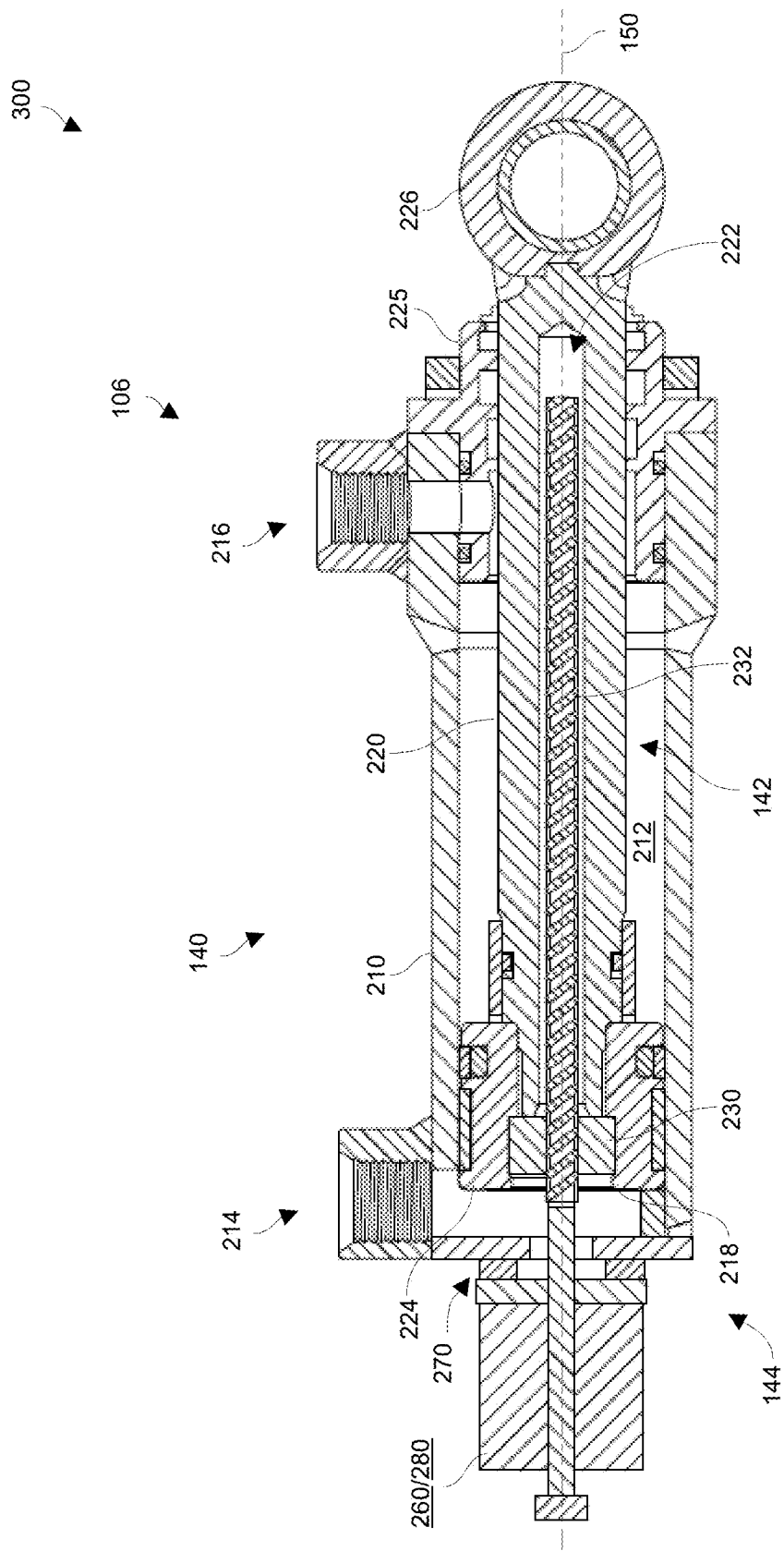
FIG. 3 is a cross-sectional side view of the fluid power actuator of FIG. 2 in a first configuration in accordance with certain embodiments.
Figure 4:
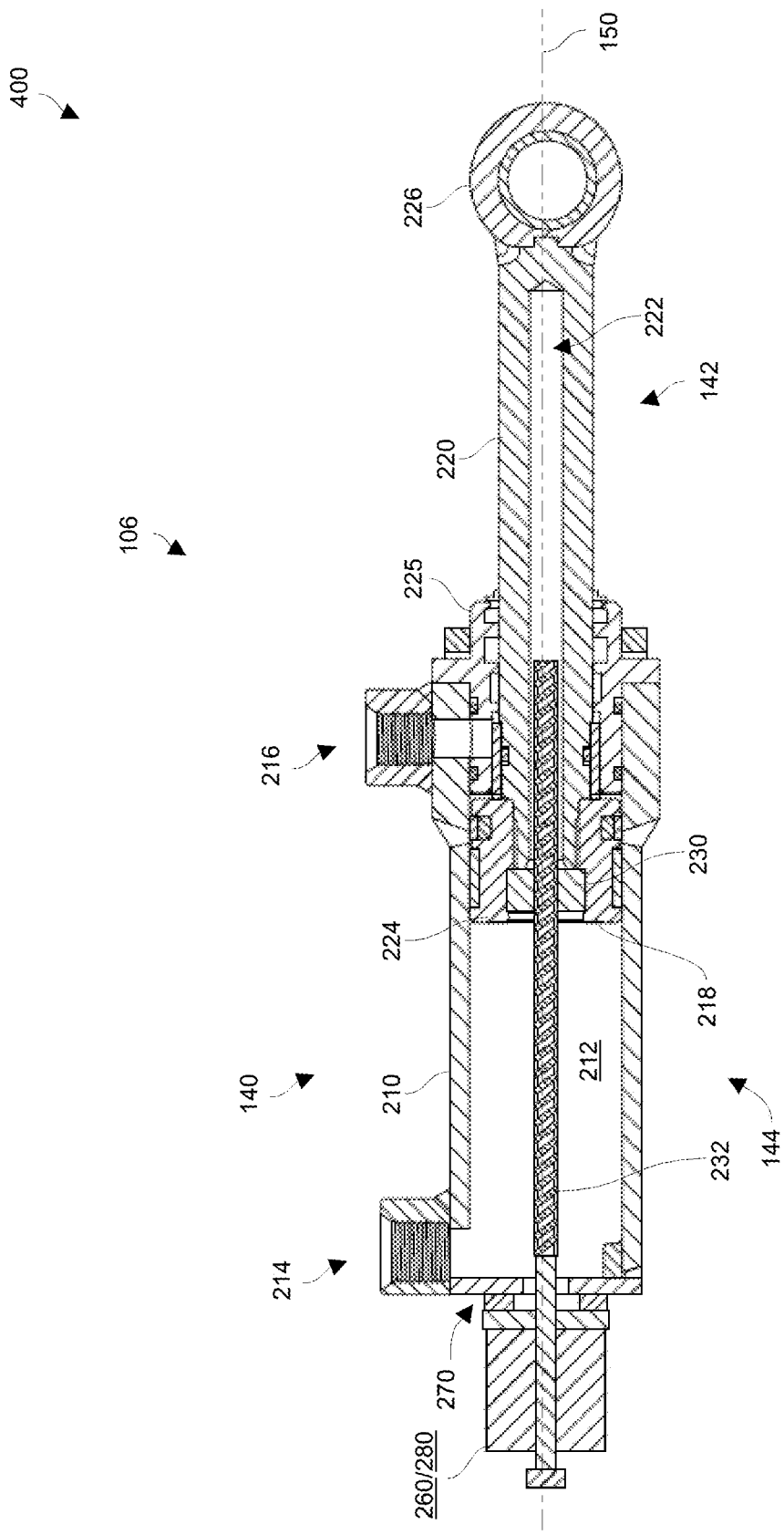
FIG. 4 is a cross-sectional side view of the fluid power actuator of FIG. 2 in a second configuration in accordance with certain embodiments.

FIGS. 2 through 4 show certain details of the fluid power actuator 106 in accordance with certain embodiments. FIG. 2 is a cross-sectional, partially exploded view 200 of the fluid power actuator 106. FIG. 3 is a cross-sectional side view 300 of the fluid power actuator 106 in a compressed state. FIG. 4 is a cross-sectional side view 400 of the fluid power actuator 106 in an extended state.

As best seen in FIG. 2, the fluid power actuator housing 140 of the fluid power actuator 106 has a cylindrical portion 210 which defines an elongated chamber (or channel) 212 to house a portion of the piston assembly 142 and the actuator axis 150. Additionally, the fluid power actuator housing 140 further defines a first fluid port 214 and a second fluid port 216 which enable fluid (e.g., hydraulic fluid, air, other gases, etc.) to enter and exit various spaces within the chamber 212.

Also, as best seen in FIG. 2, the piston assembly 142 of the fluid power actuator 106 has a piston 218 and an elongated rod-shaped portion (or section) 220 that defines an elongated central bore 222 which extends along the actuator axis 150. When the fluid power actuator 106 is assembled, the piston 218 and at least part of the rod-shaped portion 220 resides within the elongated channel 212 defined by the fluid power actuator housing 140 (FIGS. 3 and 4).

In some arrangements, the piston assembly 142 further defines other features such as a sealing portion 224 at one end to form a seal with the fluid power actuator housing 140. That is, when the fluid power actuator 106 is assembled, the fluid power actuator housing 140 and the piston assembly 142 divide the elongated channel 212 into different spaces thus enabling fluid pressure within such spaces to guide the piston assembly 142 in and/or out of the fluid power actuator housing 140.

Likewise, in some arrangements, the fluid power actuator housing 140 defines other features such as a sealing portion 225 which is similar to the sealing portion 224 defined by the piston assembly 142. The sealing portion 225 enables formation of a seal with the piston assembly 142 in a similar manner.

In some arrangements, the piston assembly 142 further defines a coupling portion 226 at another end (e.g., the end opposite the sealing portion 224). The coupling portion 226 enables the piston assembly 142 to easily couple (e.g., hinge) with the loading assembly 104 (also see FIG. 1).

As further shown in FIGS. 2 through 4, the screw assembly 144 includes a nut 230 and a screw 232. The nut 230 resides in a fixed position on the piston assembly 142 (e.g., at a front end adjacent the sealing portion 224). Furthermore, part of the screw 232 is threaded, and this threaded part of the screw 232 is constructed and arranged to engage with the nut 230 (FIGS. 3 and 4). While in this threaded situation, at least a portion of the screw 232 is disposed within the central bore 222 defined by the rod-shaped portion 220 of the piston assembly 142, and extends along the actuator axis 150.

As will be explained in further detail shortly, the screw 232 is allowed to rotate relative to the fluid power actuator housing 140 and about the actuator axis 150 under certain conditions. Such rotation enables the piston assembly 142 of the fluid power actuator 106 to move relative to the fluid power actuator housing 140 along the actuator axis 150 (e.g., to translate linearly along the actuator axis 150).

As further shown in FIG. 2, other componentry 146 is involved in operating the fluid power actuator 106 (also see FIG. 1). Such other componentry 146 includes, perhaps among other things, a fluid pumping assembly 250 and control circuitry 252.

The fluid pumping assembly 250 is constructed and arranged to control fluid pressure within the fluid power actuator 106. In accordance with certain embodiments, the fluid pumping assembly 250 includes a fluid tank to hold fluid, a set of pumps (i.e., one or more pumps), a set of valves (i.e., one or more valves), supply lines interconnected between the tank, pumps, valves, ports 214, 216, and so on.

For example, making the fluid pressure at the port 214 greater than the fluid pressure at the port 216 provides force to bias the piston assembly 142 in the outward direction (left to right in FIGS. 3 and 4) along the axis 150. Similarly, making the fluid pressure at the port 216 greater than the fluid pressure at the port 214 provides force to bias the piston assembly 142 in the inward direction (right to left in FIGS. 3 and 4) along the axis 150. Other factors may influence operation of the fluid power actuator 106 such as a current amount of loading on the piston assembly 142 (e.g., see the loading assembly 104 in FIG. 1).

The control circuitry 252 is constructed and arranged to control operation of the fluid pumping assembly 250 and the screw assembly 144 in order to extend, contract, lock and/or unlock the fluid power actuator 106. Such control may involve receiving user input (e.g., via a set of user controls), receiving sensor input (e.g., via a set of actuator sensors), and providing output (e.g., to control a set of pumps, valves, motors, etc.).

In accordance with certain embodiments, the control circuitry 252 operates using feedback in a closed loop manner. Along these lines, the fluid power actuator 106 may include additional devices such as an electric motor 260, a set of load sensors 270, and/or a brake 280. The electric motor 260 is constructed and arranged to rotate the screw 232 of the screw assembly 144. The set of load sensors 270 is constructed and arranged to provide a set of load signals indicating loading on the screw 232 (e.g., a measurement of the current amount of load between the fluid power actuator housing 140 and the screw 232). The brake 280 is constructed and arranged to prevent the screw 232 from turning relative to the fluid power actuator housing 140 when the brake is engaged (or applied) and allow the screw 232 to turn relative to the fluid power actuator housing 140 when the brake is disengaged (or released).

The additional devices may include other components 290 as well. Examples of such other components 290 include a set of user controls (e.g., one or more individual controls/levers/buttons/etc., a control panel, etc.), a set of output devices (e.g., a set of audio devices, a set of visual devices, a display screen, etc.), one or more position sensors, and so on.

It should be appreciated that fluid power actuator 106 may take a variety of different embodiments. Depending on the particular embodiment, one or more of these above-described devices may be present (or may be optional). Various details for particular embodiments of the fluid power actuator 106 will now be provided in further detail.

First Embodiments

Figure 5:
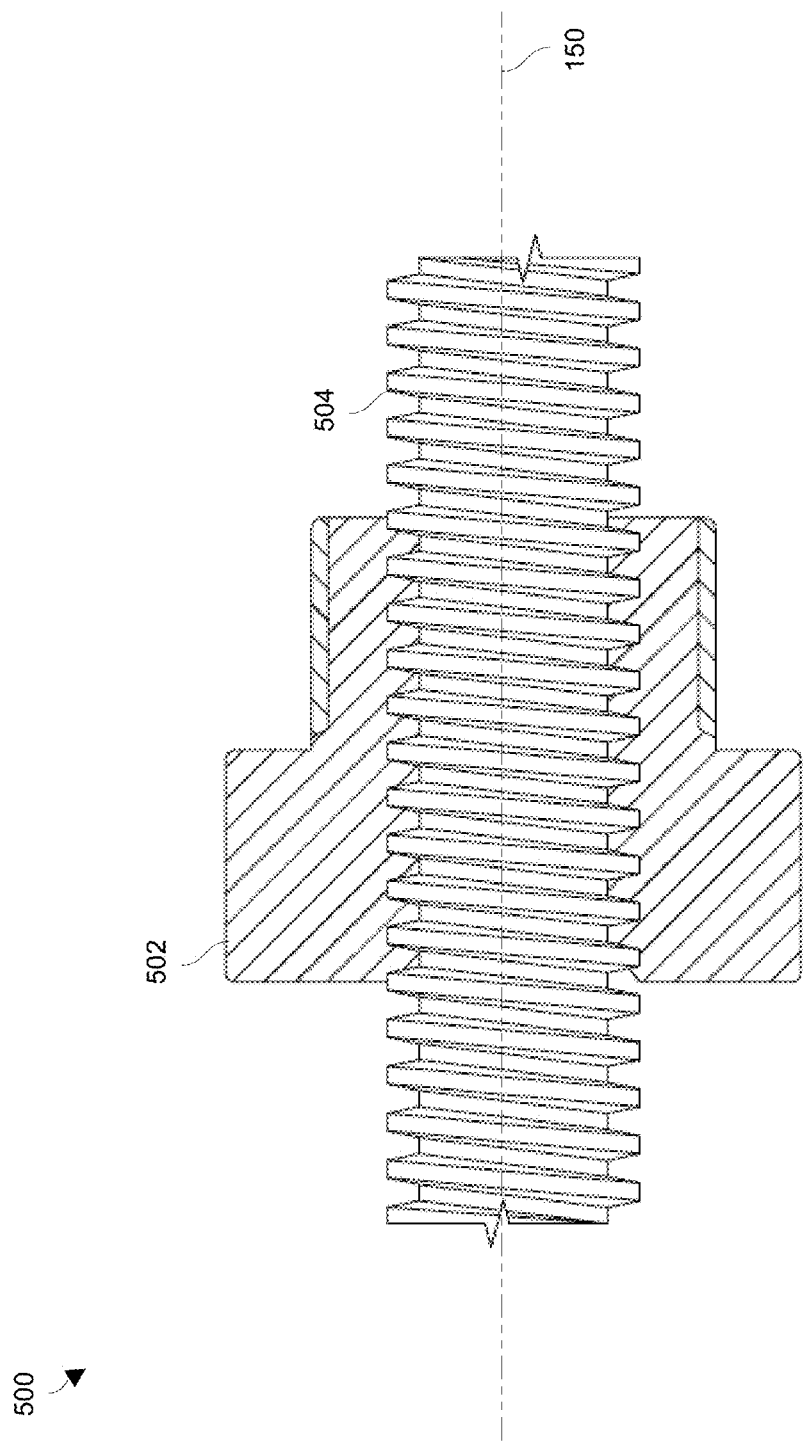
FIG. 5 is a cross-sectional view of an example screw assembly which is suitable for use in the fluid power actuator of FIG. 2 in accordance with certain embodiments.

FIG. 5 shows a cross-sectional side view of a set of screw assembly components 500 which is suitable for use for the screw assembly 144 of the fluid power actuator 106 in accordance with certain first embodiments for the fluid power actuator 106. The set of screw assembly components 500 includes a nut 502 and a screw 504 (only a portion of which is shown in FIG. 5).

The actuator axis 150 defined by the fluid power actuator housing 140 is also shown in FIG. 5 to illustrate the orientation of the set of screw assembly components 500 in the context of the fluid power actuator 106 (also see FIGS. 2 through 4). When the set of screw assembly components 500 is employed by the fluid power actuator 106, the nut 502 is disposed in a fixed position relative to the rod-shaped portion 220 of the piston assembly 142, and the screw 504 threads within the nut 502. One portion (e.g., a smooth section) of the screw 504 engages with the electric motor 260 and an opposite portion of the screw 504 resides within the central bore 222 defined by the rod-shaped portion 220 of the piston assembly 142 (FIGS. 2 through 4).

It should be appreciated that, when hydraulic fluid is used, the hydraulic fluid within the fluid power actuator 106 lubricates the nut 502 and the screw 504. Accordingly, there is no need for other periodic maintenance action to lubricate the set of screw assembly components 500.

It should be further understood that the nut 502 and the screw 504 may operate as a low efficiency screw system when the fluid power actuator 106 is inactive. Such a screw system may provide an efficiency in a range of 25% to 40% (e.g., 30%, 35%, etc.). To this end, the nut 502 and the screw 504 may use a complementary trapezoidal thread geometry which enables easy locking. In some arrangements, the screw assembly 144 uses a self-locking ACME screw. However, other arrangements use other thread angles, pitches, depths, etc. For example, suitable thread angles include 28 degrees, 29 degrees, 30 degrees, 31 degrees, and so on.

During operation of the fluid power actuator 106, the control circuitry 252 (FIG. 2) receives, from the set of load sensors 270, a set of load signals indicating how much axial loading currently exists between the screw 504 and the fluid power actuator housing 140. Such axial loading is the load that is parallel to the centerline of the screw shaft, and affects how easily the screw 504 is able to turn within the nut 502.

To extend the fluid power actuator 106, the control circuitry 252 turns the electric motor 260 so that the screw 504 rotates in a first direction (e.g., counterclockwise) to move the nut 502 in a direction away from the electric motor 260 (i.e., left to right in FIGS. 3 and 4). During this time, the control circuitry 252 balances the fluid pressure at the ports 214, 216 to minimize axial loading on the screw 504. Along these lines, the fluid pumping assembly 250 may utilize a proportional pressure control valve or a variable pressure controlled pump to achieve proper fluid pressure differential across the fluid power actuator 106 such that the load cell value is close to zero load. When there is minimal loading (e.g., zero or no axial load on the screw), the electric motor 260 is able to turn the screw 504 within the nut 502 easily (i.e., very low motor torque is required to rotate the screw 504). Accordingly, the fluid power actuator 106 is able to achieve fine positioning of the load attached to the piston assembly 142.

It should be understood that similar operation occurs to retract the fluid power actuator 106. In particular, the control circuitry 252 turns the electric motor 260 so that the screw 504 rotates in a second direction (e.g., clockwise) to move the nut 502 in a direction toward the electric motor 260 (i.e., right to left in FIGS. 3 and 4). Again, during this time, the control circuitry 252 balances the fluid pressure at the ports 214, 216 to minimize axial loading on the screw 504. Accordingly, the fluid power actuator 106 is able to achieve fine positioning of the attached load in both directions.

Furthermore, when power is removed and fluid pressure is released, the set of screw components 500 self-lock, i.e., the friction between the nut 502 and the screw 504 is sufficiently high so that the fluid power actuator 106 remains in its current state of extension and no drifting occurs. Along these lines, due to the trapezoidal thread geometry, the set of screw components 500 provides, among other things, increased clamping speed, greater strength, and better durability. Accordingly, the fluid power actuator 106 is well suited for a variety of equipment in which precision, stability, and reliability are critical.

It should be appreciated that the low friction/resistance provided by pressure balancing alleviates the need to heavily provision the electric motor 260. Rather, with normal provisioning, there are less demands on electric motor size, weight, cost, and so on.

In some arrangements, the screw 504 connects to or changes to a smooth shaft allowing a shaft to exit the rear of the cylinder through a shaft seal. For example, the shaft of the electric motor 270 may serve as the rotor to the electric motor 260.

In some arrangements, the electric motor 260 is mounted to the rear end of the fluid power actuator housing 140 on the set of load sensors 270 (e.g., load cells which measure the axial load from the screw shaft). The axial load may be reacted by the electric motor 260 or a separate axial bearing between the electric motor 260 and fluid power actuator housing 140 (not shown).

In some arrangements, the electric motor 260 takes the form of a servo or stepper motor connected to a shaft of the screw 504 with the option for the shaft to pass through and exit the rear or the motor. Such a feature allows access for back-up manual operation (e.g., using a hand crank or hand power tool to turn the screw 504).

Second Embodiments

Figure 6:
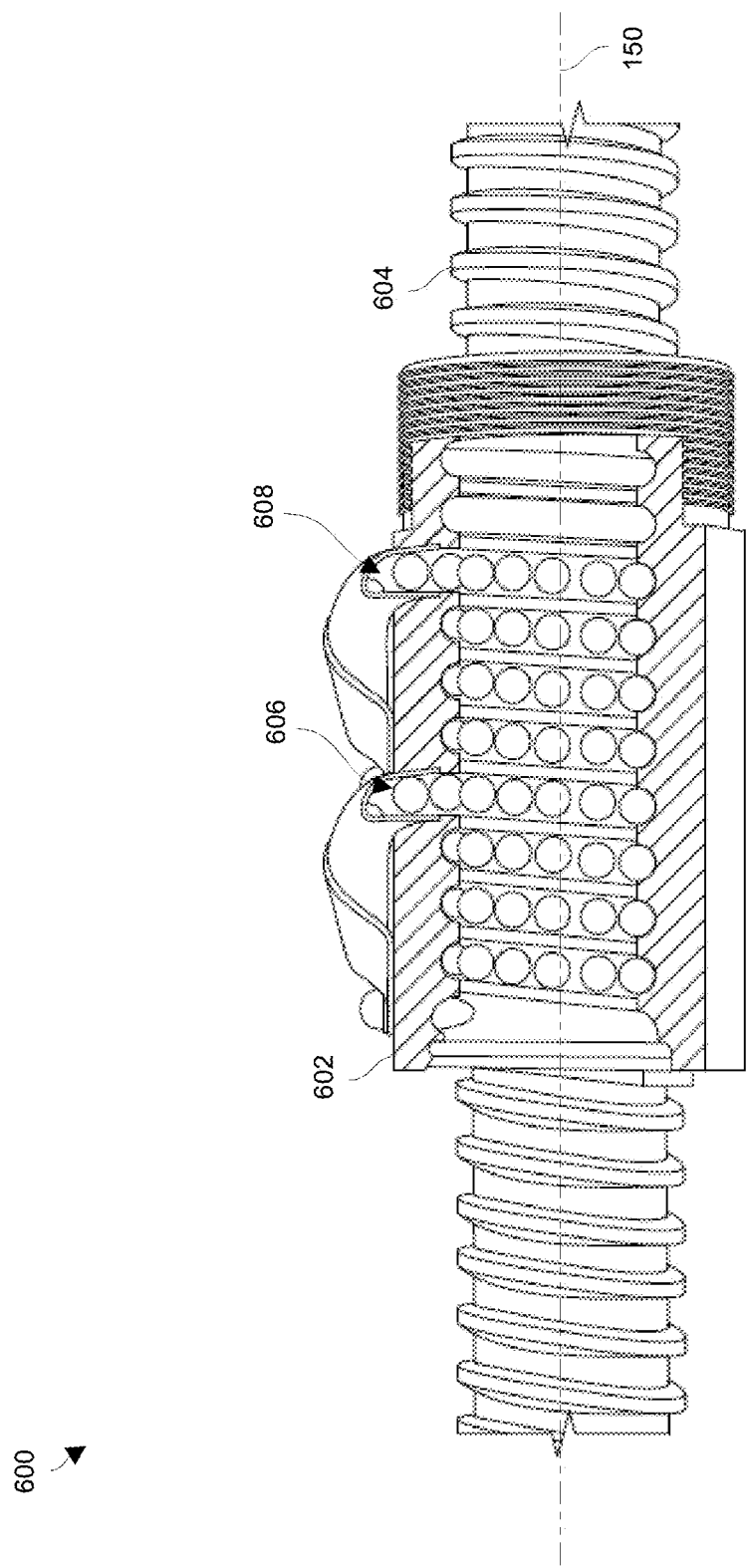
FIG. 6 is a cross-sectional view of another example screw assembly which is suitable for use in the fluid power actuator of FIG. 2 in accordance with certain embodiments.

FIG. 6 shows a cross-sectional side view of a set of screw assembly components 600 which is suitable for use for the screw assembly 144 of the fluid power actuator 106 in accordance with certain second embodiments for the fluid power actuator 106. The set of screw assembly components 600 includes a nut 602, a screw 604 (only a portion of which is shown in FIG. 6), and a plurality of balls (or bearings) 606.

The actuator axis 150 defined by the fluid power actuator housing 140 is also shown in FIG. 6 to illustrate the orientation of the set of screw assembly components 600 in the context of the fluid power actuator 106 (also see FIGS. 2 through 4). When the set of screw assembly components 600 is employed by the fluid power actuator 106, the nut 602 is disposed in a fixed position relative to the rod-shaped portion 220 of the piston assembly 142, and the screw 604 threads within the nut 602 while the plurality of balls reside in a recirculating channel 608 defined therebetween to minimize friction. One end of the screw 604 engages with the brake 280 and an opposite end of the screw 604 resides within the central bore 222 defined by the rod-shaped portion 220 of the piston assembly 142 (FIGS. 2 through 4).

The brake 280 may be electronically actuated (e.g., opened and/or closed in response to a set of electric signals), and is electrically coupled with the control circuitry 252. Accordingly, the brake 280 is operatively coupled with the screw 604 (FIGS. 2 through 4). As a result, the brake 280, under electronic control from the control circuitry 252, can prevent rotation of the screw when applied and/or allow rotation of the screw 604 when released.

In some arrangements, the brake 280 includes a set of springs that biases the brake 280 from a disengaged state to an engaged state. Such spring biasing of the brake 280 into the engaged state prevents the screw 604 from rotating (e.g., actuator locking) when power to the control circuitry 252 is removed.

In some arrangements, the brake 280 is disengaged in response to activity initiated by control circuitry 252. Along these lines, the brake 280 may be released hydraulically, pneumatically, and/or electrically. For example, the brake 280 may take the form of a wet disc hydraulic brake assembly or spring applied electric motor brake.

During operation, the control circuitry 252 governs placement of the piston assembly 142 relative to the fluid power actuator housing 140 by managing fluid pressure. Low friction between the fluid power actuator housing 140 and the piston assembly 142 as well as feedback using an external position sensor (e.g., see the other components 290 in FIG. 2) enable precision actuator positioning. Furthermore, such low friction operation imposes lower demands/stress/etc. on the fluid power componentry. Accordingly, the control circuitry 252 is able to provide appropriate timing for brake release, brake re-application, and so on.

In some embodiments, control logic algorithms for the control circuitry 252 enable operation from the control circuitry 252 to be based either solely on actuator position and velocity using brake control timing, or based on measurements of the apparent system inertia from an acceleration profile (e.g., using that information to adjust the brake-application timing for a more precise position control).

It should be appreciated that, in the ball screw embodiments, loading sensors become optional to assist with the timing of the brake release without unwanted load motion, or using other fluid pressure sensors or switches and control logic to determine the safe timing/conditions for brake release without unwanted motion.

It should be further appreciated that back-up manual operation in one direction simply involves gradual/proportional release of the brake 280 to safely lower the load and operation of the brake 280. Additionally, manual operation in the opposite direction simply involves manual rotation of the screw 604 (e.g., for back-up lifting operations).

In some arrangements, a non-self locking ACME screw is used as the set of screw assembly components 600 rather than a recirculating ball screw system. Such arrangements nevertheless provide actuator locking in any position when power is removed due to the presence of the brake 280.

Figure 7:
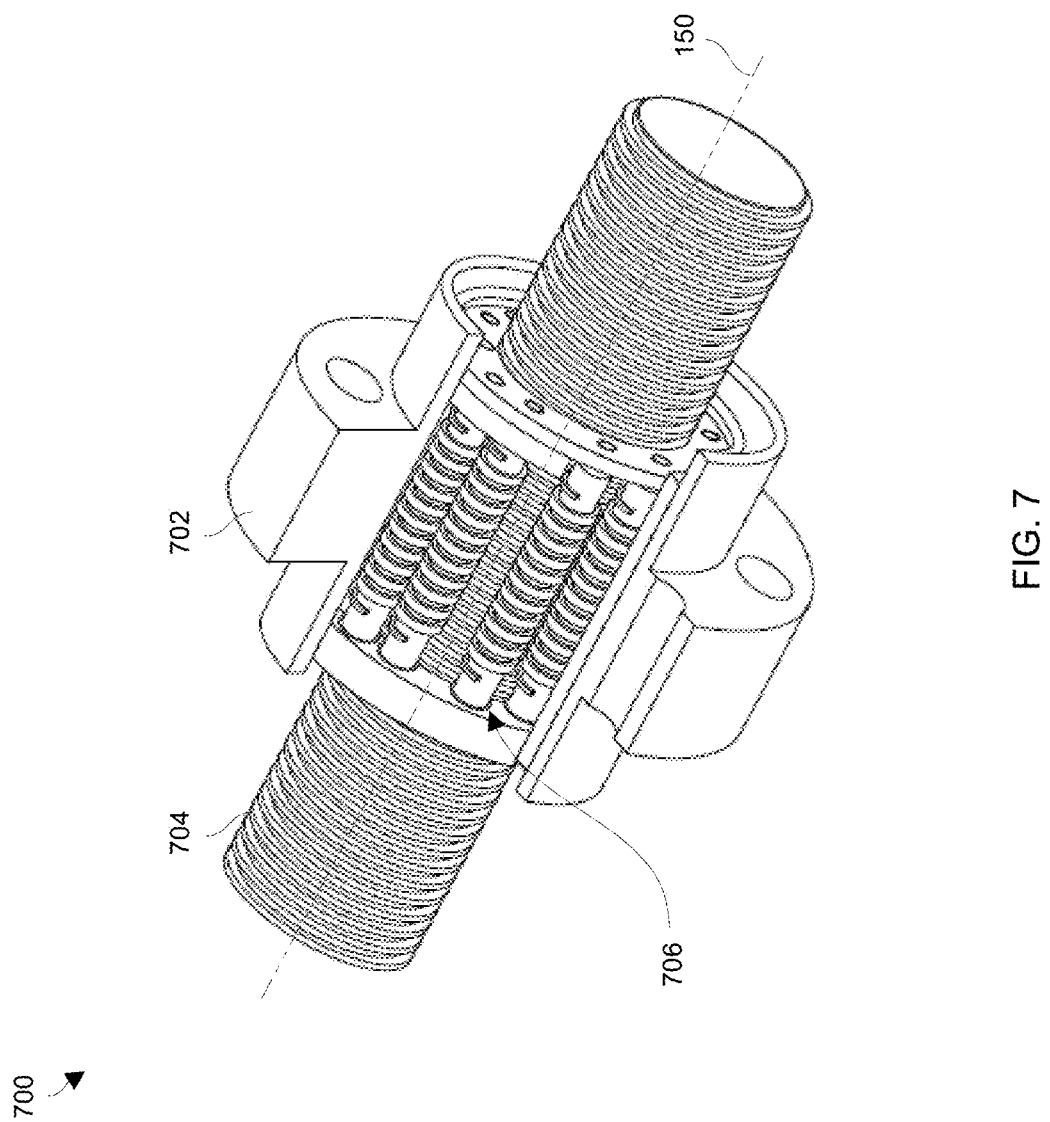
FIG. 7 is a perspective view of yet another example screw assembly which is suitable for use in the fluid power actuator of FIG. 2 in accordance with certain embodiments.

As shown in FIG. 7 and in accordance with some embodiments, a set of screw assembly components 700 is used for the screw assembly 144 rather than the set of screw assembly components 600. That is, the set of screw assembly components 700 is interchangeable with the set of screw assembly components 600.

The set of screw assembly components 700 includes a nut 702, a screw 704 (only a portion of which is shown in FIG. 7), and a plurality of rollers (or threaded members) 706. The plurality of rollers 706, which are held by and within the nut 702 to encircle the screw 704, enables the nut 702 and screw 704 to rotate relative to each other with minimal friction/resistance. Accordingly, as with the set of screw assembly components 600, using the set of screw assembly components 700 enables the fluid power actuator 100 to operate under less power, with finer control/precision, etc.

Further Details

Figure 8:
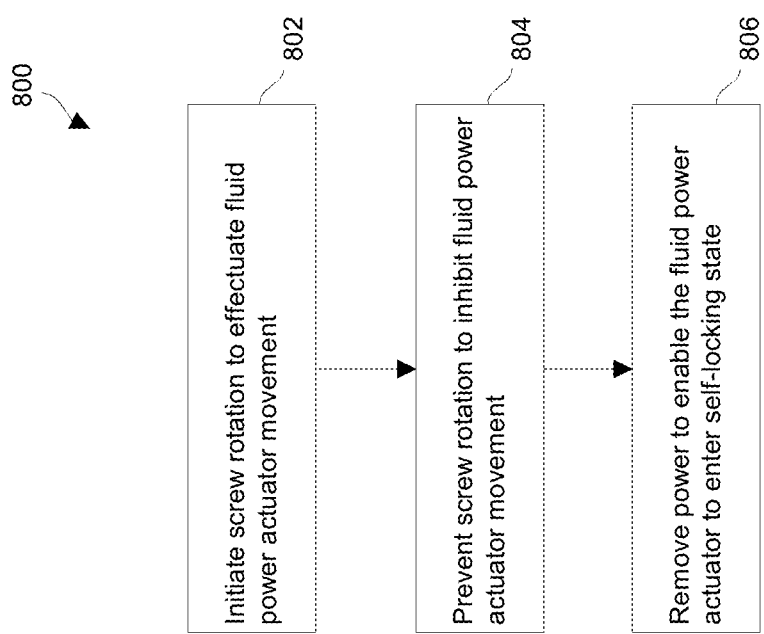
FIG. 8 is a flowchart of a procedure involving a fluid power actuator which utilizes a screw assembly in accordance with certain embodiments.

FIG. 8 is a flowchart of a procedure 800 involving a fluid power actuator which utilizes a screw assembly in accordance with certain embodiments. Such a method may be performed by a controller, e.g., a human operator, control circuitry, combinations thereof, etc.

At 802, the controller initiates screw rotation to effectuate high precision fluid power actuator movement. For example, the controller may direct an electric motor to rotate the screw. In some embodiments, the controller maintains minimal loading on the screw thus enabling the electric motor to turn the screw using very low torque. In some embodiments, the controller partially or fully releases a brake thus enabling the screw to turn with less friction.

At 804, the controller prevents the screw from rotating further. As a result, the fluid power actuator remains in place.

In some embodiments, the controller maintains appropriate fluid pressure in response to axial loading feedback to provide precision and stability. In some embodiments, the controller applies precise braking (e.g., using acceleration, inertia, etc. as factors) for smooth response behavior.

At 806, the controller removes power. As a result, the fluid power actuator automatically enters a self-locking state. In some embodiments, the screw is a self-locking type screw. In some embodiments, a brake automatically returns to an engaged state to hold the screw in place.

As mentioned above, improved techniques involve a fluid power actuator 100 that utilizes a screw assembly 106 which enables actuation with minimal friction (or resistance) during operation. Using such a screw assembly 106 enhances fluid power actuator performance such as by providing high precision positioning, simple mechanical locking, and convenient manual back-up operation. Additionally, such a screw assembly 106 removes the need for heavily provisioning an electric motor and/or other parts. In some arrangements, the screw assembly 106 has a trapezoidal thread geometry to provide self-locking. In some arrangements, the screw assembly 106 has a recirculating ball screw geometry or roller screw geometry for low friction operation. Such techniques overcome various deficiencies of conventional hydraulic, electric and electro-hydraulic linear actuators.

While various embodiments of the present disclosure have been particularly shown and described, it will be understood by those skilled in the art that various changes in form and details may be made therein without departing from the spirit and scope of the present disclosure as defined by the appended claims.

It should be appreciated that convention actuators to lift heavy payloads or equipment (such as loading munitions on an aircraft) are typically either hydraulic, electric or electro-hydraulic linear actuators. Conventional hydraulic actuators have lower position precision, susceptible to leaking/drifting over time, require frequent maintenance to repair leaks, and may need redundant actuators to ensure no failure mode results in loss of load control, required by some agency safety certifications (e.g., U.S. Air Force nuclear certification). Conventional electric actuators are very expensive for high force applications, require periodic lubrication, are difficult to manually move the load in case of loss of power, require internal load holding brakes to prevent unwanted motion when not powered and are not normally designed with high enough safety factors required by nuclear certification standards. Conventional electro-hydraulic actuators have elements of both disadvantages plus are more difficult to package inside compact areas as the motor, pump, reservoir & valve assemblies are all mounted directly to the actuator.

In accordance with certain embodiments, a servo/stepper motor driven self-locking ACME screw and load cell are provided to either a hydraulic cylinder or electro-hydraulic actuator. Precision positioning can be accomplished with a very small low torque motor, mechanical locking in any position and manual back-up operation can be provided which counters many of the negative aspect of using a hydraulic actuator. Alternatively, by using a non-self-locking lead screw or ball screw and a spring applied, hydraulically, pneumatically or electrically released rotary brake assembly (with or without the servo/stepper motor & load cell), similar advantages can be provided with even fewer components.

In some embodiments, a self-locking ACME screw and nut is added inside the hollow rod of a fluid power actuator. The actuator rod is externally restrained by other means to prevent the rod from rotating. The ACME Screw connects to or changes to a smooth shaft allowing a shaft to exit the rear of the cylinder through a shaft seal. A servo or stepper motor is connected to the shaft with the option for the shaft to pass through and exit the rear or the servo motor, allowing access for back-up manual operation using a hand crank or hand power tool. The servo motor is mounted to the rear end of the cylinder on load cells which measure the axial load of the screw shaft. The axial load is either reacted by the servo motor or a separate axial bearing between the servo motor and cylinder. Either a proportional pressure control valve or a variable pressure controlled pump is used to achieve the proper fluid pressure differential across the fluid power actuator such that the load cell value is close to zero load (e.g., no axial load on the screw). This allows a very low motor torque required to rotate the screw for fine positioning of the load attached to the actuator. When hydraulic fluid is used, the hydraulic fluid lubricates the screw & nut, preventing the need for periodic maintenance action to lubricate the screw. When power is removed, the pressure is released and the self-locking ACME screw will lock the actuator in position.

In other embodiments, a non-self-locking ACME screw or low friction recirculating ball screw or roller screw is used and the servo/stepper motor is replaced with a spring applied, hydraulically/pneumatically/electrically released rotary brake (such as a wet disc hydraulic brake assembly or spring applied electric motor brake). This also provides actuator locking in any position when power is removed. Use of the load cells become optional to assist with the timing of the brake release without unwanted load motion, or, using other pressure sensors or switches and control logic to determine the safe timing/conditions for brake release without unwanted motion. Precision positioning would be achieved using an external position sensor and the appropriate timing of the brake release and brake re-application. Such control logic algorithms can either be based solely on actuator position and velocity using brake control timing or can attempt to measure the apparent system inertia from the acceleration profile and use that information to adjust the brake-application timing for a more precise position control. Optional back-up manual operation would require gradual/proportional release of the brake to safely lower the load and operation of the brake plus manual rotation of the screw for back-up lifting operations.

It should be understood that the various actuator embodiments disclosed herein may be well-suited for certain specialized applications such as munitions handling equipment, aircraft munitions loading, and so on. Other applications include commercial and/or military material handling applications, lift trucks, belt loaders or de-icers and/or washer vehicles, and so on. Such modifications and enhancements that are disclosed herein are intended to belong to various embodiments of the disclosure.

What is claimed is:

1. Loading apparatus, comprising:
   a base;
   a loading assembly having a first end coupled with the base and a second end constructed and arranged to carry a load; and
   a fluid power actuator including:
   a fluid power actuator housing coupled with the base,
   a piston assembly coupled with the second end of the loading assembly, the piston assembly being constructed and arranged to move relative to the fluid power actuator housing in response to changes in fluid pressure within the fluid power actuator housing,
a screw assembly coupled with the fluid power actuator housing and the piston assembly, the screw assembly being constructed and arranged to control movement of the piston assembly relative to the fluid power actuator housing,
a load sensor coupled with the fluid power actuator housing and a screw of the screw assembly,
a fluid pumping assembly coupled with the fluid power actuator housing, and
an electronic controller coupled with the load sensor and the fluid pumping assembly, the electronic controller being constructed and arranged to receive a sensor signal from the load sensor and operate the fluid pumping assembly to provide the changes in the fluid pressure based on the sensor signal.

2. Loading apparatus as in claim 1 wherein the fluid power actuator housing defines an elongated channel;
wherein the piston assembly includes a piston and a rod-shaped portion that defines a central bore, at least a portion of the rod-shaped portion residing within the elongated channel defined by the fluid power actuator housing; and
wherein the screw assembly includes:
a nut disposed in a fixed position relative to the rod-shaped portion of the piston assembly, and
a screw that threads within the nut, at least a portion of the screw being disposed within the central bore defined by the rod-shaped portion of the piston assembly.

3. Loading apparatus as in claim 2 wherein the piston assembly is constructed and arranged to slide along a central axis defined by the fluid power actuator housing in response to the changes in the fluid pressure; and
wherein the screw is constructed and arranged to rotate relative to the fluid power actuator housing and the piston assembly about the central axis while remaining at a fixed location on the central axis.

4. Loading apparatus as in claim 3 wherein the fluid power actuator housing includes:
a first port to supply fluid to a first space within the elongated channel between the piston assembly and the fluid power actuator housing, and
a second port to supply fluid to a second space within the elongated channel between the piston assembly and the fluid power actuator housing, at least one of the fluid power actuator housing and the piston assembly separating the second space from the first space.

5. Loading apparatus as in claim 4 wherein the nut and the screw define threads with trapezoidal shapes to provide self-locking between the nut and the screw.

6. Loading apparatus as in claim 4 wherein the screw assembly further includes:
a plurality of balls, and
wherein the nut and the screw of the screw assembly define a recirculating ball channel that recirculates the plurality of balls in a continuous path during screw assembly operation to minimize friction.

7. Loading apparatus as in claim 4 wherein the first end of the loading assembly forms a hinge with the base;
wherein the second end of the load assembly includes a munitions carrier to carry munitions; and
wherein the fluid power actuator is constructed and arranged to control height of the munitions carrier relative to the base to provide high precision munitions loading.

8. A fluid power actuator, comprising:
a fluid power actuator housing;
a piston assembly constructed and arranged to move relative to the fluid power actuator housing in response to changes in fluid pressure within the fluid power actuator housing; and
a screw assembly coupled with the fluid power actuator housing and the piston assembly, the screw assembly being constructed and arranged to control movement of the piston assembly relative to the fluid power actuator housing.

9. The fluid power actuator as in claim 8 wherein the fluid power actuator housing defines an elongated channel;
wherein the piston assembly includes a piston and a rod-shaped portion that defines a central bore, at least a portion of the rod-shaped portion residing within the elongated channel defined by the fluid power actuator housing; and
wherein the screw assembly includes:
a nut disposed in a fixed position relative to the rod-shaped portion of the piston assembly, and
a screw that threads within the nut, at least a portion of the screw being disposed within the central bore defined by the rod-shaped portion of the piston assembly.

10. The fluid power actuator as in claim 9 wherein the piston assembly is constructed and arranged to slide along a central axis defined by the fluid power actuator housing in response to the changes in the fluid power fluid pressure; and
wherein the screw is constructed and arranged to rotate relative to the fluid power actuator housing and the piston assembly about the central axis while remaining at a fixed location on the central axis.

11. The fluid power actuator as in claim 10 wherein the fluid power actuator housing includes:
a first port to supply fluid to a first space within the elongated channel between the piston assembly and the fluid power actuator housing, and
a second port to supply fluid to a second space within the elongated channel between the piston assembly and the fluid power actuator housing, at least one of the fluid power actuator housing and the piston assembly separating the second space from the first space.

12. The fluid power actuator as in claim 10 wherein the nut and the screw define threads with trapezoidal shapes to provide self-locking between the nut and the screw.

13. The fluid power actuator as in claim 12, further comprising:
an electric motor coupled with the screw, the electric motor being constructed and arranged to rotate the screw in response to an electric control signal.

14. The fluid power actuator as in claim 13, further comprising:
a load sensor coupled with the fluid power actuator housing and the screw,
a fluid pumping assembly coupled with the fluid power actuator housing, and
an electronic controller coupled with the load sensor and the fluid pumping assembly, the electronic controller being constructed and arranged to receive a sensor signal from the load sensor and operate the fluid pumping assembly to provide the changes in the fluid pressure based on the sensor signal.

15. The fluid power actuator as in claim 14 wherein the load sensor includes a load cell constructed and arranged to indicate, within the sensor signal, an amount of loading between the fluid power actuator housing and the screw; and
    wherein the electronic controller, when providing the changes in the fluid pressure based on the sensor signal, is constructed and arranged to minimize loading between the fluid power actuator housing and the screw.

16. The fluid power actuator as in claim 10 wherein the screw assembly further includes:
    a plurality of balls, and
    wherein the nut and the screw of the screw assembly define a recirculating ball channel that recirculates the plurality of balls in a continuous path during screw assembly operation to minimize friction.

17. The fluid power actuator as in claim 16, further comprising:
    a brake coupled with the screw, the brake being constructed and arranged to prevent rotation of the screw when applied and allow rotation of the screw when released.

18. The fluid power actuator as in claim 17, further comprising:
    an electronic controller coupled with the brake, the electronic controller being constructed and arranged to coordinate brake operation with movement between the fluid power actuator housing and the piston assembly to provide precision positioning.

19. The fluid power actuator as in claim 18 wherein the brake includes a set of springs that biases the brake from a disengaged state to an engaged state to provide actuator locking when power to the electronic controller is removed.

20. Loading apparatus as in claim 1 wherein the piston assembly includes a piston disposed within the fluid power actuator housing, and
    wherein the electronic controller is further constructed and arranged to:
        based on the sensor signal indicating the presence of a load between the screw and the fluid power actuator housing, direct an increase in fluid pressure on a particular side of the piston to decrease the load between the screw and the housing.

\* \* \* \* \*